Oct. 28, 1941.                M. RUGGIERI                2,260,917
                              INSULATOR PIN
                           Filed April 10, 1939
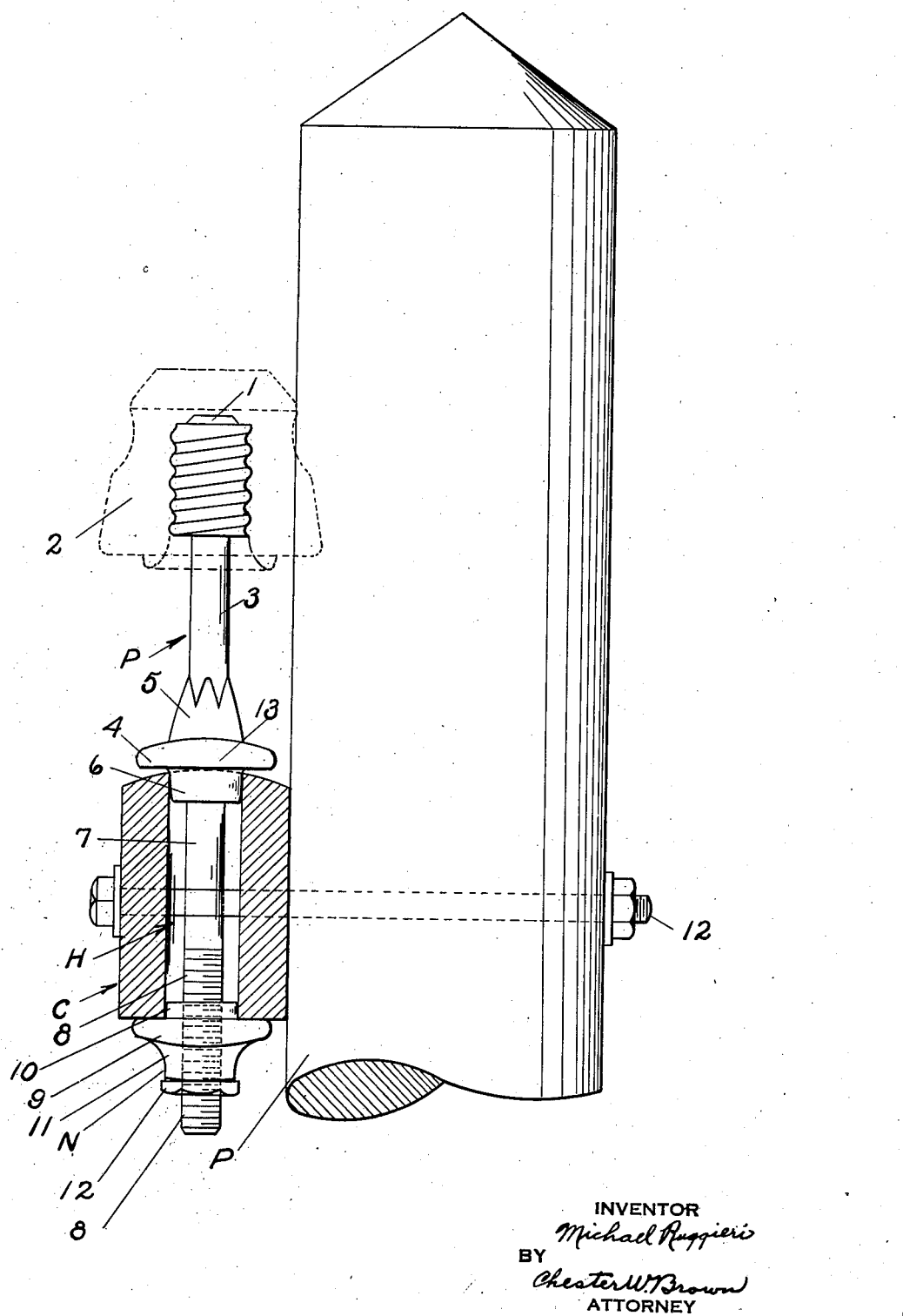
INVENTOR
Michael Ruggieri
BY
Chester W. Brown
ATTORNEY Patented Oct. 28, 1941

2,260,917

UNITED STATES PATENT OFFICE 2,260,917

INSULATOR PIN

Michael Ruggieri, Stroudsburg, Pa., assignor to Line Material Company, South Milwaukee, Wis., a corporation of Delaware Application April 10, 1939, Serial No. 267,002

1 Claim. (Cl. 248—220.5)

This invention relates to improvements in insulator pins for electric transmission lines.

Heretofore, it has been common practice to provide wooden insulator pins for supporting electric transmission lines from poles having wooden crossarms and such pins have been mounted in holes extending vertically through the arms. Such holes have of necessity been large in diameter and as a result, special metal pins have been designed to fit these holes when it has been desired to substitute metal pins for the wooden pins.

Accordingly it is an object of this invention to provide for standard metal pins, pin-centering means adapted to properly align the pin with reference to crossarm holes previously provided for wooden pins.

Another object is to provide centering means which may be economically manufactured and installed and which functions efficiently.

The drawing shows a view in side elevation, partly in section, of an insulator pin embodying my invention and mounted on a crossarm.

The crossarm C is mounted in the usual manner on a pole P and is shown sectioned vertically through the pin-mounting hole H. This hole is of a diameter adapted to receive a wooden pin (not shown) which may be assumed as removed therefrom.

The metal pin P comprises a threaded head 1 upon which an insulator 2, shown in broken lines, is mounted, a shank 3, an annular flange 4 having a tapered abutment 5 above the flange 4 and a slightly tapered cylindrical pin-centering flange portion or extension 6, and a shank portion 7 below the flange 4 having threaded portion 8.

Threadedly mounted on the shank portion 7 of the pin is a pin-centering nut N comprising an annular flange 9 having a slightly tapered cylindrical pin-centering flange portion or extension 10 above the flange 9 and an abutting portion 11 below the flange 9. A palnut 12 is threaded on the shank portion 7 of the pin and is adapted to lock the pin centering nut N as will hereafter appear.

As indicated in the drawing, the shank portion 7 of the pin P extends through the hole H in the crossarm C and the pin-centering flange portion 6 on the pin fits snugly in the upper end of the hole with the flange 4 drawn into firm contact with the crossarm at 13.

Preferably the flange 4, abutment 5 and flange portion 6 are integrally formed with each other and with the shank 3 of the pin P, but it will be obvious to those skilled in the art that such elements may be otherwise secured together in a unitary structure without departing from the spirit of this invention.

Obviously, the elemental portions of the pin-centering nut N previously noted are integrally formed. When the nut N is threaded on the shank portion 7, the flange 9 is drawn tightly into contact with the crossarm C to thereby draw the flange 4 on the pin P into like contact with the crossarm. As indicated, the pin-centering portion 10 on the nut N fits snugly in the lower end of the hole H and cooperates with the pin-centering portion 6 on the pin P to maintain the pin in proper alignment with the hole.

It is obvious that the standard pin P may be used under standard mounting conditions wherein the pin mounting hole H is of a standard diameter substantially equal to the diameter of the shank portion 7. See for example Patent 1,546,591 to Kyle, issued July 21, 1925, for Cushion head insulator pin. It is further obvious that under standard pin mounting conditions the extensions 6 and 10 operate as flanges against the crossarm C, to hold the pin in rigid position.

After the pin P has been securely mounted on the crossarm, the palnut 12 may then be threaded upon the shank portion 7 and firmly engaged with the nut N to prevent the latter from backing off the threaded portion 8. Preferably the abutment 5 on the shank 3 of the pin and the abutment 11 on the nut N are square in horizontal cross-section to facilitate engagement of tools therewith when the pin is mounted upon the arm.

It will be understood that the construction of the pin is standard throughout with the exception of the provision of the pin-centering flange portion 6 and also that the construction of the nut N is also standard with the exception of the pin-centering flange portion 10. Thus the manufacturing costs of the pin and nut are not materially increased over that of similar pins and nuts previously manufactured. Obviously the cost of installation of the pin disclosed herein will be substantially the same as, if not lower than, previously and will compare favorably to that of installing special-type pins heretofore provided for mounting under the same conditions.

From the foregoing disclosure, it will be apparent that I have provided a standard-type metal pin provided with means adapting it for mounting on a crossarm having a pin-mounting hole of a diameter sufficient to receive a wooden pin, that this means will efficiently maintain the metal pin in proper alignment with the hole, and that such results will be secured economically because of the fact that the pin construction does not depart materially from the standard construction thereof.

I claim:

A standard insulator pin comprising a rod of substantially uniform cross-sectional area and threaded at one end, pin-centering means comprising an annular flange and a conical extension therebelow of greater diameter than the pin disposed intermediate the ends thereof and a nut having an axially extending conical extension, said extensions adapted to accommodate the pin to holes of varying sizes in a cross-arm.

MICHAEL RUGGIERI.